(12) United States Patent
Miller et al.

(10) Patent No.: US 6,370,267 B1
(45) Date of Patent: Apr. 9, 2002

(54) SYSTEM FOR MANIPULATING DIGITIZED IMAGE OBJECTS IN THREE DIMENSIONS

(75) Inventors: Daniel B. Miller; Viktor Yurkovsky, both of New York, NY (US)

(73) Assignee: The Duck Corporation, New York, NY (US)

( * ) Notice: Subject to any disclaimer, the term of this patent is extended or adjusted under 35 U.S.C. 154(b) by 0 days.

(21) Appl. No.: 09/453,681

(22) Filed: Dec. 3, 1999

Related U.S. Application Data

(63) Continuation of application No. 08/751,374, filed on Nov. 19, 1996, now Pat. No. 5,999,641, which is a continuation of application No. 08/154,309, filed on Nov. 18, 1993, now abandoned.

(51) Int. Cl.[7] .................................................. G06K 9/00
(52) U.S. Cl. ....................................... 382/154; 382/232
(58) Field of Search ................................. 382/100, 141, 382/154, 232, 258, 293, 296, 298, 305; 345/419, 420, 156, 564, 565, 566, 704, 848, 850, 851; 348/578

(56) References Cited

U.S. PATENT DOCUMENTS 4,891,748 A * 1/1990 Mann ............................ 463/1
5,313,306 A * 5/1994 Kuban et al. ................. 358/65

* cited by examiner

Primary Examiner—Phuoc Tran
(74) Attorney, Agent, or Firm—Levisohn, Lerner, Berger & Langsam

(57) ABSTRACT

This invention relates to a method and apparatus for displaying photo-realistic three-dimensionally projected views of real objects in real scenes and enabling the viewer to manipulate these objects and the scene with several degrees of freedom, such as rotation, zooming, or otherwise "handling" them as though they were physically manipulated.

25 Claims, 2 Drawing Sheets

Acquisition Process Diagram

Fig. 1 - Acquisition Process Diagram
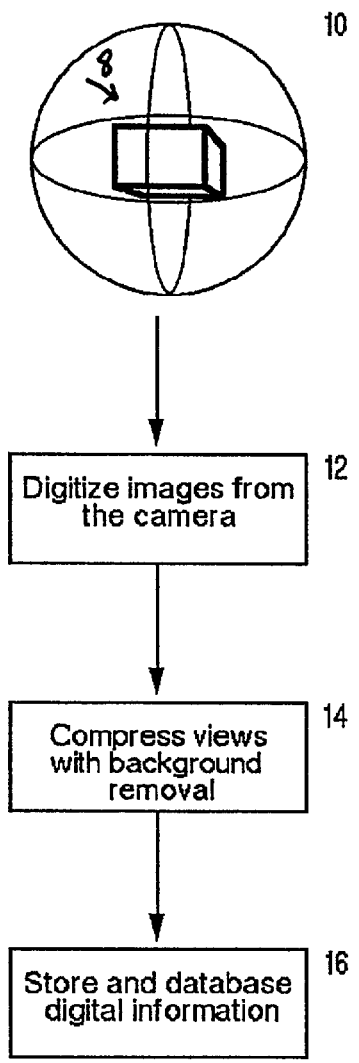

Fig. 2 - Display Process Diagram
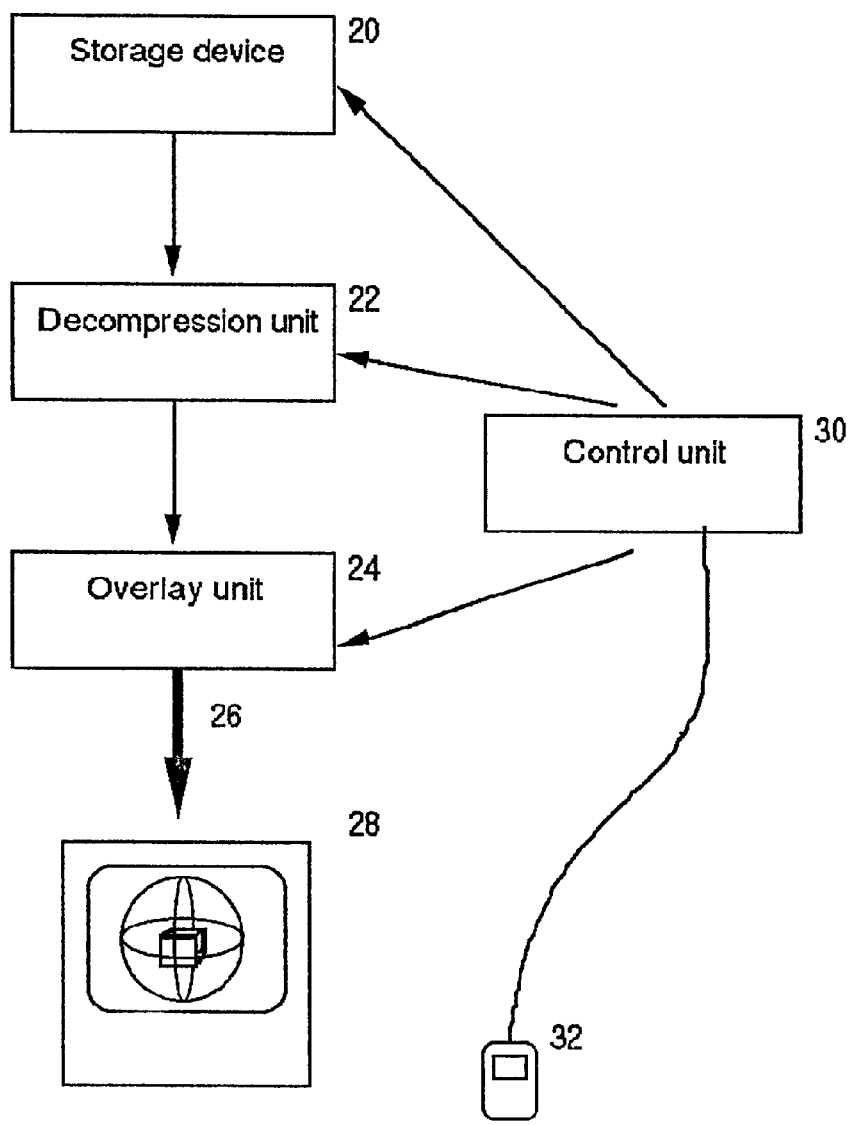

SYSTEM FOR MANIPULATING DIGITIZED IMAGE OBJECTS IN THREE DIMENSIONS

RELATED APPLICATIONS

This application is a continuation of U.S. Ser. No. 08/751,374 filed Nov. 19, 1996, now U.S. Pat. No. 5,999,641, which is a continuation of U.S. Ser. No. 08/154,309 filed Nov. 18, 1993. This application claims the priority of all of the prior applications, the disclosures of which are fully incorporated herein by reference.

BACKGROUND OF THE INVENTION

This invention relates to a method and apparatus for enabling interactive communication with objects on a video display in which the operator is able to manipulate images of natural objects by combining them, rotating, zooming in or otherwise acting as though the objects were being physically manipulated in three-dimensional space.

The use of interactive video material is becoming very widespread. From simple computer games to proposed digital television systems, the ability for the viewer or user to interact with objects on the screen is increasingly important. While there are many devices which allow a viewer to move a cursor to different parts of the screen and select objects, in most cases the interactive relationship takes place in two dimensions and the objects being manipulated are computer-generated rather than natural photographic or video quality objects.

The process of three-dimensional computer rendering is well established. This process uses computer simulation to create three-dimensional views of computer models. Computer simulation is accomplished through fairly sophisticated software techniques such as ray tracing and texture mapping and require very expensive computer equipment to render multiple images sequentially to give the illusion of real-time interaction.

An object of this invention is to provide a method and apparatus to permit displaying photo-realistic three-dimensionally projected views of real objects in real scenes and enabling the viewer to manipulate these objects and the scene with several degrees of freedom, such as rotation, zooming, or otherwise "handling" them as though they were physically manipulated.

Another object of this invention is to provide such as a system which allows for 360° rotation including spherical rotation and which enables the viewer to focus on any aspect of the displayed object quickly, accurately and easily.

Another object of this invention is to provide the ability to separate the acquired object from its background and provide the user with the ability to combine multiple objects over different backgrounds, including motion video backgrounds, and to give the user independent control over the placement and rotation of these objects.

Another object of this invention is to allow the user to similarly manipulate multiple moving objects such as people talking.

Another object of this invention is to allow the user to interact with views of three-dimensional objects, either natural or computer-generated, on a low-cost device such as an off-the-shelf PC.

Other objects, advantages and features of this invention will become more apparent from the following description.

SUMMARY OF THE INVENTION

The above objects are accomplished by providing a method and apparatus to acquire multiple views of an object to satisfy all degrees of freedom required by the user. This apparatus may consist of a camera set up on a track around the object. Alternatively, the camera may be stationary and the object may be moved such as being placed on a turntable. In any case, views all around the object are obtained. The views from all the required points are digitized with the objects placed or considered being against a blue background to allow the separation of the objects from the background. The digital images are then compressed using a suitable image compression technology that allows storage of pixel maps of irregular shapes and multiple transparency levels (such as an alpha-channel). Each digital image is then databased along with the information about the position of the camera in relation to the object. Enough images are acquired to allow the required degrees of freedom, such as rotation or zooming.

For viewing of the acquired images, the digital images along with the position information are called in the right sequence to the decompression device and placed into a digital frame buffer to be displayed on a video monitor. Multiple objects may be decompressed and using the transparency information from the data, composited over a background. The background itself may also be a decompressed still image or motion video. The user interacts with the digital images via any available input device, such as a mouse, keyboard or a remote control unit. A suitable control unit, such as a computer, interprets the user requests and selects correct digital images to be decompressed and correctly positioned in the frame buffer, providing the user with the illusion of interacting directly with the stored digital images.

Via the input device, the viewer is able to:

(a) select any of the objects on the screen for further manipulation;

(b) move any of the objects available and arbitrarily place them over any available backgrounds, including motion video backgrounds;

(c) rotate the selected object and see it from any angle that has previously been acquired;

(d) zoom in on any portion of the selected object or the entire scene consisting of multiple objects and the background;

(e) to otherwise manipulate such objects with any degree of freedom provided at the time of acquisition of these objects.

Alternate viewing systems may be designed, constraining the ability to manipulate acquired objects to specific times or degrees of freedom and allowing the system to respond to the user requests in ways other than displaying the video images. These viewing systems may allow some of the object to be manipulated by the user while directly controlling other visible objects, thus creating a "virtual space" for the user. This allows for the creation of interactive training systems capable of providing the user with information about the available object in video or text form, and the creation of games where some of the objects seem to have "intelligence" and act without user's intervention.

In a simple example, a person at home will be able to purchase a sweater or a dress by looking at images of a model wearing it and being able to see it from all angles. Additionally, if one wanted to study the stitching or other fine details, the interactive display will permit zooming in on the displayed image so that significant detail can also be observed. The viewer can then choose to see the model wearing the selected item in different settings, such as a cocktail party or the beach. The viewer can select from models of different heights and hair colors, for instance, to see how the item looks on different people or even preselect a self image onto which the clothing can be placed.

In a training application, a student may be able to observe a car engine in operation. The student can look at the engine from any angle and zoom in to see different parts of it in motion or slow down or stop the motion of the engine to get a clearer picture. The student may choose an extra degree of freedom provided for by the creator of the application to "explode" the engine and see the parts separate while the motion is going on. Alternatively, the student may be able to crank the engine "by hand" to see how the different moving parts inter-relate. The student may select any of the parts of the engine and examine them individually and possibly get textual or graphic information about that part. In this example, the original views of the engine may be acquired via a camera or prerendered using traditional three-dimensional rendering techniques.

In a video game example, the user may see a 'virtual' world and interact with objects and characters that exist in it. In a murder mystery setting, for instance, the player may examine objects in a room by picking them up, move from place to place, and interview the characters. The characters may be actual people, views of which have been acquired from different angles while they talk. The player can 'walk' around these characters as they talk and walk around themselves. Player may assume role of a chair and guide it around.

In another aspect of the invention, the acquisition mechanism removes the background of the object and compresses the images in real time. The information is then transmitted via a communication line such as a high-bandwidth telephone line to another location for decompression. Several streams of information may be fed to multiple locations, and the viewing device can combine objects from different streams for display on a single video monitor. This arrangement allows for a new method of video conferencing, where each participant may place other participants into the same digital setting, such as around a "virtual" conference table on the screen. The participants may then zoom around the table to concentrate on the speaker, or zoom in on other participants to view their reactions. Each of the participants may have their own favorite setting without affecting the others, choosing from any available pre-stored setting and create the illusion of the meeting taking place virtually anywhere in the world.

BRIEF DESCRIPTION OF THE DRAWING

FIG. 1 is a block diagram of the acquisition system which generates and stores data according to the present invention;

FIG. 2 is a block diagram of the system which utilizes the stored data to perform the functions of this invention.

DETAILED DESCRIPTION

FIG. 1 is a block diagram showing the acquisition process by which data is generated to enable the comprending method of the present invention to be successfully employed. The object to be imaged is illustratively shown as a box 8 located with three orthogonal planes 10a, 10b and 10c illustrated intersecting the box. A camera 11 moves around the object 8 perhaps in a spiral path to acquire views from all angles of the object being imaged. Other paths may be employed for a single or multiple camera arrays. It is understood that the multiple cameras may be employed to speed the imaging process. Alternatively, the camera 11 could be inside the object, such as in a room, with the only limitation being that real images from designated spatial locations be generated.

An alternative image gathering process can be employed in which a computer rendered three dimensional model provides the image data related to spatial orientation which reduces the initial imaging process. A combination of both 3D rendering and real imaging can be employed as well.

The image signals are supplied to a digitizer 12, such as that available with an Intel Action Media 2 board used with any IBM compatible P.C. If the image information is simulated 3D, it may be supplied in digital form thus eliminating the need for digitizer 12.

The digital output of digitizer 12 is supplied to a digital compressor 14 which compresses the digital information to enable such information to be more easily accommodated with available transmission and storage facilities. The digital compressor 14 is capable of eliminating background information which was generated during the initial imaging step which utilized real objects. This is somewhat similar to a process known as chroma keying used on television and motion picture production.

The compressor 14 may discard the background information and merely store data concerning only the actual object imaged. The object 8 shown is a regular structure, but as is understood, any live object, scene or any combination thereof may be imaged with all of the real life irregularities imaged, as well, providing image data to the system.

One of the features of this invention is that transparency data and edge softness relating to how objects are visually perceived is generated in compressor 14.

The compressed digital data generated in block 14 contains digital information about the image as well as spatial information relating to how the image data was acquired, such as camera position, distance, etc., as related to the object. At the same time, identifying labels or text associated with the images are generated and stored. By compressing such digital data, it may be stored in a storage device 10 which is accessible to permit manipulation of the digital data to recreate, manipulate or otherwise work with the stored images. The data may be stored on any storage medium, such as magnetic or optical.

A preferred digital compression method is that identified in our copending patent application Ser. No. 08/060,613 entitled Apparatus and Method to Digitally Compress Video Signals filed May 12, 1993.

FIG. 2 is a block diagram showing how the image data stored in a storage device 16 is employed to create and manipulate desired images. This process has been identified with the trademark Comprending as originating with the inventors' assignee herein.

Storage device 20 is similar or could even be the same as storage device 16. A control unit 30, such as a PC, addresses storage device 20 to call up appropriate compressed digital information which may also include spatial data. The control unit 30 also maintains data concerning all of the objects it is storing so that the objects can be manipulated by an operator of the control unit using a mouse 32 or any other input device which is connected to control unit 30. A voice actuated input device may also be employed.

As the control unit is operated, stored digital data is retrieved and, such data is decompressed in a decompression unit 22, which itself may be part of the previously described Intel circuit operated according to a preferred decompression scheme as identified in our previously identified patent application.

The control unit 30 actually can build a scene comprising multiple objects which have been stored in storage device 20. The control unit 30 is also connected to an overlay unit which is capable of combining such multiple objects while also employing the edge softness and transparency data information.

The control unit is capable of creating a scene containing stored multiple objects over any background, but the operator has the ability to construct any scene from any angle with any degree of light or distance desired by merely operating input device 32 in conjunction with storage device 20 and overlay unit 24.

The created scene is carried on line 26 to be imaged on image display unit 28. The image or scene can be manipulated as desired by the operator.

The objects captured in the first step may be stationary or moving and multiple views which are time based may be generated and stored. For example, a bird flapping its wings can be stored over a period of time.

The background data can also be in motion or stationary and such background can be part of the scene being constructed. The moving background data can simulate the moving of the camera through the space of the scene being created.

An alternative approach to increase the power of this invention is to create views which were not actually taken but can be formed by combining information about the same from different perspectives and constructing a new view of a combined perspective view of the same object.

This invention has been described with a preferred embodiment identified. One of ordinary skill in the art can provide other variations which may fall within the scope of the claims of this patent.

What is claimed is:

1. A system for remotely and electronically manipulating image objects in three dimensions comprising:
   means to form a plurality of images of said object from different directions around said object and generating images related to each of said plurality of images formed and the spatial location of each of said plurality of images taken,
   digitally compressing said image and location digital signals,
   storage means for storing said digitally compressed signals,
   a control unit connected to said storage means to address the digital information stored thereon,
   said control unit controlled by an operator to selectively generate said stored image and spatial location digital signals,
   an image display unit connected to said control unit and to said storage means to form a display of said imaged subject, and
   said control unit operated to manipulate said object on said image display unit.

2. A system for remotely and electronically manipulating image objects in three dimensions according to claim 1, wherein images all around said object are formed.

3. A system for remotely and electronically manipulating image objects in three dimensions according to claim 1, wherein said object comprises a plurality of objects.

4. A system for remotely and electronically manipulating image objects in three dimensions according to claim 1, wherein said means to form said plurality of images comprises a camera.

5. A system for remotely and electronically manipulating image objects in three dimensions according to claim 4, wherein said camera is moved around said object.

6. A system for remotely and electronically manipulating image objects in three dimensions according to claim 5, wherein said camera is moved in a spiral path around said object.

7. A system for remotely and electronically manipulating image objects in three dimensions according to claim 1, wherein said control unit and said image display form means to create a scene on said image display utilizing any of the plurality of stored images.

8. A system for remotely and electronically manipulating image objects in three dimensions according to claim 7, wherein said plurality of images comprises overlapping objects capable of being mapped onto and off from other of said images.

9. A system for remotely and electronically manipulating image objects in three dimensions according to claim 7, wherein said control means comprises means to move said plurality of images.

10. A system for remotely and electronically manipulating image objects in three dimensions according to claim 9, wherein said control means comprises means to move said plurality of objects on a time basis.

11. A system for remotely and electronically manipulating image objects in three dimensions according to claim 7, wherein said storage means comprises means to store background scene digital signals to be used with any of said plurality of stored images.

12. A system for remotely and electronically manipulating image objects in three dimensions according to claim 11, wherein said background scene comprises a moving scene.

13. A system for remotely and electronically manipulating image objects in three dimensions according to claim 11, wherein said background scene is stationary.

14. A system for remotely and electronically manipulating image objects in three. dimensions according to claim 1, wherein said means to generate said digital signals comprises means to create a standard blue background of each of said formed images.

15. A system for remotely and electronically manipulating image objects in three dimensions according to claim 1, wherein said manipulation of said object includes zooming in on said object.

16. A system for remotely and electronically manipulating image objects in three dimensions according to claim 1, wherein said manipulation of said object comprises rotating said object;
   means to rotate the selected object and view it from any angle that has been previously generated by said means to form said plurality of images.

17. A system for remotely and electronically manipulating image objects in three dimensions according to claim 1, wherein said camera is located inside the object being viewed and said object is moved relative to said camera.

18. A system for remotely and electronically manipulating image objects in three dimensions according to claim 1, wherein said means to form a plurality of images comprises a plurality of cameras.

19. A system for remotely and electronically manipulating real image objects in three dimensions according to claim 3, further comprising a manually controlled input means connected to said control unit.

20. A system for remotely and electronically manipulating image objects in three dimensions according to claim 19 wherein said manually controlled input means comprises a mouse.

21. A system for remotely and electronically manipulating image objects in three dimensions according to claim 1, further comprising an audio command controlled input means connected to said control unit.

22. A system for remotely and electronically manipulating image objects in three dimensions according to claim 1, further comprising a first location where said means to form said plurality of images is implemented in real time and a second location remote from said first location where said scenes are created of said image display unit.

23. A system for remotely and electronically manipulating image objects in three dimensions according to claim 22, wherein said control unit located at said second location receives a plurality of images from different sources at a plurality of different first locations.

24. A system for remotely and electronically manipulating image objects in three dimensions according to claim 1, further comprising means to form and store artificial computer generated images to be used with said control unit to be displayed on said image display center in conjunction with said created scene.

25. A system for remotely and electronically manipulating image objects in three dimensions according to claim 1, wherein said objects are in motion.

\* \* \* \* \*